March 24, 1953     F. A. ANETSBERGER     2,632,410
ROTARY FLOUR BRUSH
Filed Aug. 13, 1951            3 Sheets-Sheet 1
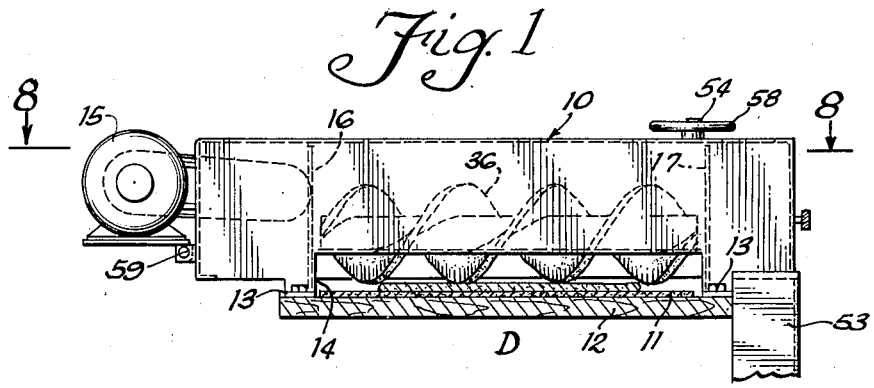
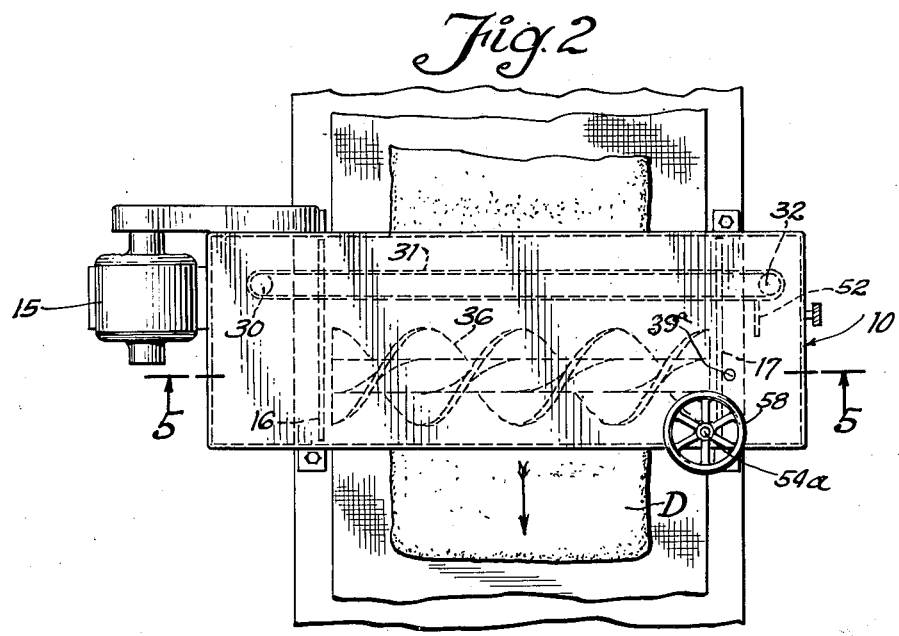
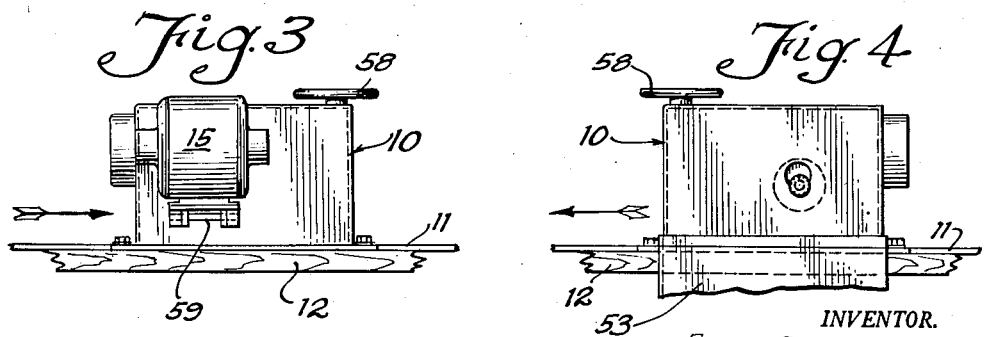
INVENTOR.
FRANK A. ANETSBERGER
BY Sheridan, Davis & Cargill
Att'ys

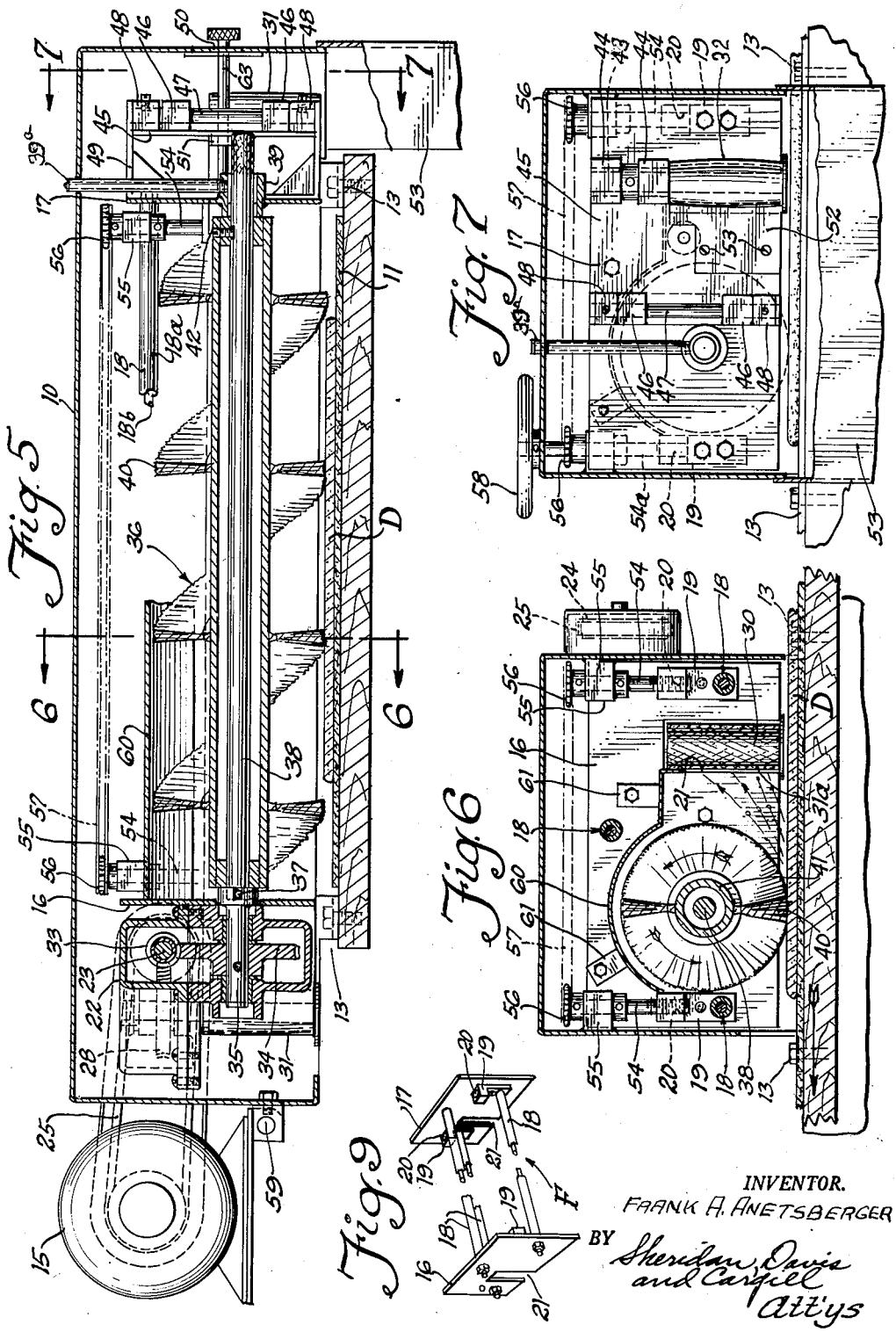

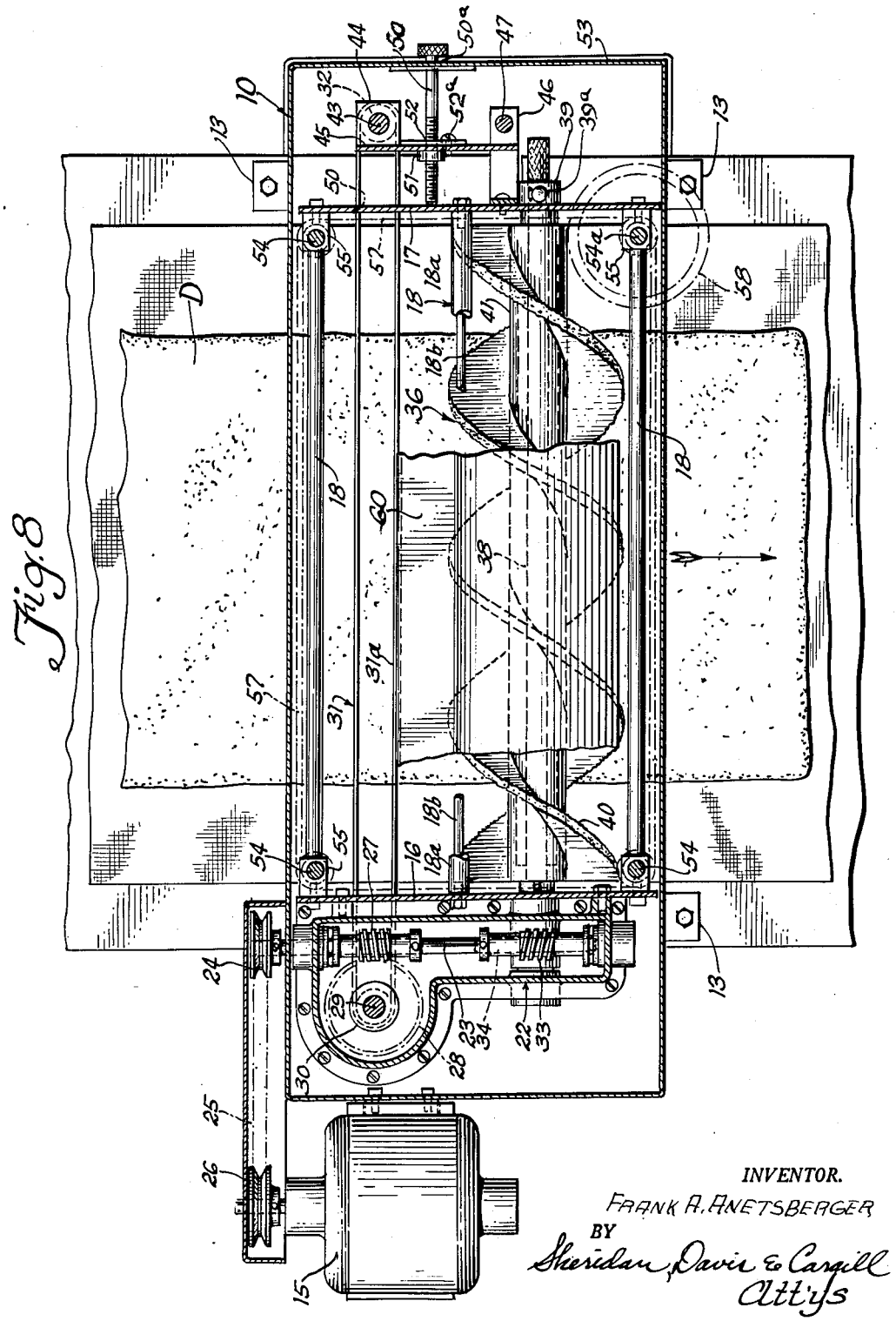

Patented Mar. 24, 1953

2,632,410

UNITED STATES PATENT OFFICE 2,632,410

ROTARY FLOUR BRUSH

Frank A. Anetsberger, Chicago, Ill., assignor to Anetsberger Brothers, Inc., Northbrook, Ill., a corporation of Illinois Application August 13, 1951, Serial No. 241,517

7 Claims. (Cl. 107—44)

This invention relates to rotary flour brushes for use in bakeries in conjunction with worktables of the type provided with endless conveyors which carry dough therealong to various stations where workmen or mechanical devices perform operations in succession such as rolling, die cutting, crunching, etc. in forming dough pieces into bakery products ready for the oven. The conveyor receives the dough, usually in sheeted form, from a sheeting mechanism located at one end of the conveyor. In the sheeting operation, flour is applied to the dough to prevent it from adhering to the sheeting rollers or belts and as the dough issues from the sheeter onto the conveyor, it frequently has loose flour thereon in excess of that desired on the finished dough pieces. Brushing the excess flour from the dough by hand has heretofore been practiced but such results in adding flour dust to the atmosphere, loss of flour, and also requires the services of a baker's helper or other attendant. It is an object of the present invention, therefore, to provide motor-operated apparatus that will remove surplus flour from dough as the latter moves in the form of continuous or interrupted sheets or pieces along a conveyor of a worktable and which will collect the removed flour in a suitable receptacle for re-use.

Another object of the invention is to provide apparatus for removing excess flour from dough moving on a conveyor which comprises a rotary brush, means for receiving the flour from the brush and conveying it to a receptacle and means for effecting vertical adjustment of the brush and associated driving and driven mechanism to working positions appropriate to the thickness of the dough being treated or to an elevated inoperative position in instances where the brushing operation is not required.

A further object of the invention is to provide improved means for intercepting and collecting the flour projected from the dough by a rotatable brush extending transversely of the moving dough and for continuously transporting the flour so collected to a receiving receptacle.

Other objects of the invention relate to various features of construction and arrangement of parts which will be apparent from a consideration of the following specification and accompanying drawings disclosing one form of apparatus that is illustrative of the present invention.

In the drawings:

Figure 1 is a front elevational view of the improved apparatus disclosed as mounted transversely of the conventional baker's worktable provided with an endless conveyor;

Fig. 2 is a top plan view of the apparatus shown in Fig. 1;

Fig. 3 is an end elevational view of the apparatus looking to the right in Fig. 2;

Fig. 4 is an end view of the apparatus looking to the left in Fig. 2;

Fig. 5 is a vertical sectional view taken approximately on the line 5—5 of Fig. 2;

Fig. 6 is a sectional view taken on line 6—6 of Fig. 5;

Fig. 7 is a sectional view taken on line 7—7 of Fig. 5;

Fig. 8 is a horizontal sectional view taken on line 8—8 of Fig. 1; and

Fig. 9 is a detached view showing a vertically adjustable mechanism carrying frame which is shown in skeletal form.

In the drawing, 10 indicates generally a casing of box-like form which is adapted to be positioned transversely of the upper run 11 of an endless conveyor supported by a bakery worktable 12. In Fig. 1 the table is shown as being wider than the conveyor belt 11 and provides space along the longitudinal edges for supporting the casing in position transversely of the conveyor. The conveyor is shown with feet 13 adapted to be bolted or otherwise attached to the table. The casing 10 is open at the bottom and the longitudinal side walls are cut away at the lower edges at 14 above the conveyor as indicated in Fig. 1.

A suitable mechanism supporting frame F is located within the casing and is adapted to support a rotary brush and flour pickup belt hereinafter described and to support also a motion translating mechanism by means of which the belt and the brush are driven by an electric motor 15 or other suitable power source. The frame referred to is shown in skeletal form in Fig. 9 and, as illustrated, comprises end walls 16 and 17 secured together in spaced apart relation by ties 18, three being shown. The ties 18 in the form shown consist of tubular members through each of which a rod extends and which at its ends is attached to the end plates 16 and 17. In Fig. 8, the tubular member referred to is indicated at 18a while the rod is indicated by reference character 18b.

The facing surfaces of the plates 16 and 17 are provided with elevator nuts 19, two being provided on each of the plates. As shown, the nuts are generally of inverted L-shaped form, the vertical portions of which are secured to the respective plates 16 and 17 while the horizontal portions are provided with threaded vertical openings 20 for receiving threaded elevator shafts by means of which the frame may be raised and lowered as will be hereinafter described. The plates 16 and 17 likewise are provided with vertical slots 21 extending upwardly from the lower edges of the plate which accommodate a flour pickup belt, the runs of which are arranged vertically and which belt extends longitudinally of the casing 10 as will be described later.

Secured to the left hand plate 16 of the adjustable frame is a housing indicated generally by the numeral 22 and which is adapted to move with the frame as the latter is adjusted vertically. Within the housing is journalled a horizontal shaft 23 one end of which extends from the housing and is provided with a belt pulley 24 driven by a belt 25 from the pulley 26 of the motor 15. The shaft 23 is provided with a worm 27 which meshes with a horizontal worm gear 28 secured to a vertical shaft 29 which extends downwardly to the exterior of the housing 22 and carries a drive pulley 30 which operates the flour pickup belt 31 which is also trained around a pulley 32 adjacent the other end of the casing 10 and is adjustable for the purpose of tensioning the belt as will be described later. The shaft 23 is provided with a second worm 33 which meshes with a worm wheel 34 mounted on a short shaft 35 journalled within the housing 22 and which constitutes the drive shaft for a horizontally arranged brush indicated generally by the numeral 36. Rotation of the shaft 23 by the motor 15 through the driving mechanism just described will effect rotation of the drive pulley 30 of the flour pickup belt 31 and will effect also rotation of the shaft 35 which effects rotation of the brush 36. The direction of drive of the pulley is as indicated by the arrow in Fig. 8. In other words, the run of the belt adjacent the brush moves to the right as viewed in Fig. 8 while the brush rotates clockwise as viewed from the left-hand side in Fig. 8 which is in a direction to cause the bristles of the brush to throw loose flour from the dough passing therebeneath against the vertical run 31a of the belt 31.

The shaft 35 at its right-hand end, as viewed in Fig. 5, is provided with a socket diametrically through which extends a drive pin 37 for drivingly engaging the bifurcated end of a brush supporting shaft 38, the other end of which shaft is supported in a bearing 39 secured in an opening in the frame plate 17. The brush 36 comprises, in the form illustrated, a helical row of bristles 40 carried by a tubular shaft 41 adapted to be slipped over the shaft 38 and secured thereto as by a set screw 42. The protruding right-hand end of the shaft 38 is shown as being knurled for convenience in assembly and disassembly of the brush structure. An oil tube 39a extends vertically from the bearing 39 to the exterior of the casing 10 through which oil may be supplied to the bearing.

The pulley 32 around which the right-hand end of the belt 31 passes, as shown in Fig. 8, is mounted on a vertical shaft 43 (see Figs. 7 and 8) which shaft is supported by a pair of spaced sleeves 44 (see Fig. 7). The sleeves 44 are secured to a swingably mounted plate 45, the opposite edge of which plate is provided with a second pair of spaced sleeves 46 through which extends a pintle 47 which also extends into sleeves 48 which are secured to a bracket 49 which, in turn, is secured to the right-hand surface of plate 17, as viewed in Figs. 5 and 8. The plate 45 is thus swingable about the pintle 47 as an axis whereby the outer free edge thereof, which is the right-hand edge shown in Fig. 7, and which carries the pulley 32, can be adjusted for the purpose of tightening the belt 31.

Means for adjusting the plate 45 for tightening the belt 31 is shown as comprising an adjusting screw 50 which passes through a suitably shaped opening 50a in the end wall of the casing 10 and through a threaded boss 51 carried by the hinged plate 45. The innermost end of the screw 50 is adapted to abut the frame plate 17. As the screw 50 is turned in a direction to move inwardly, or to the left as viewed in Fig. 8, the hinge plate 45 will be swung clockwise about the axis of the pintle 47 for moving the pulley 32 to the right as viewed in said figure. Actually, the movement of the pulley will be in a slight arc but the extent of adjustment required for applying tension to the belt from time to time is so small that the arcuate movement is not objectionable.

Assuming that the brush 36 is located at the proper elevation above the conveyor 11 for brushing the surface of a dough strip D shown thereon, the rotation of the brush will sweep the loose flour upwardly from the surface of the dough strip and to the right as viewed in Fig. 6 or in a direction the reverse of the direction of the movement of the dough. The flour strikes the forward run 31a of the belt 31 and tends to cling thereto, the belt preferably being of canvas. Should some of the flour not cling to the belt, it drops back on the dough and will again be thrown against the belt. The belt being in operation, the flour clinging thereto will be conveyed transversely of the dough strip to the right as viewed in Fig. 8 until it is removed from the belt by a scraper blade 52 which is secured to the swingable plate 45 by screws 52a which pass through horizontally elongated openings in the blade which enable the plate to be adjusted laterally into suitable contact with the belt. The flour removed from the belt by the scraper drops from the casing 10 into any suitable receptacle 53 which may be removed from time to time for emptying.

For the purpose of varying the elevational position of the brush in accommodating the same to dough strips of different thicknesses, means are provided for raising the supporting frame F, including the plates 16 and 17, by means of which the operating mechanism within the casing 10 is supported. The elevating means referred to consists of four vertical shafts each indicated generally by the numeral 54 and located adjacent the longitudinal side walls of the casing 10. The shafts 54 are supported in arms or lugs 55 secured to the side walls of the casing 10 and at the upper ends are provided with sprocket wheels 56. The wheels 56 are co-planar and around the same extends a sprocket chain 57 which constrains all the sprocket wheels and the associated shafts 54 to operate in unison. The lower ends of the shafts 54 are threadedly received in the threaded openings 20 of the elevator nuts 19. Rotation of the shafts 54 in one direction or the other will effect the raising or lowering of the supporting frame F together with the pickup belt 31, the brush 36 and the motion translating mechanism of the housing 22. One of the shafts 54 is indicated by the reference character 54a and extends upwardly through the top wall of the casing 10 and is provided with a hand wheel 58 by means of which the shafts 54 can be operated for effecting the raising or lowering of the brush and associated mechanism within the casing 10. The lower edge of the flour belt is at an elevation slightly higher than the lower periphery of the rotary brush whereby when the brush is in position for effective brushing action with respect to a dough sheet or dough pieces of a given thickness, the lower edge of the belt will be spaced slightly above the level of the dough.

During the raising and lowering of the mechanism within the casing, the resulting vertical movement of the shaft 23 and of the adjusting screw 49 is accommodated by appropriate openings provided therefor in the respective walls of the casing 10. The motor 15 is shown pivotally supported by a horizontal shaft 59 mounted on the adjacent end wall of the casing 10 whereby the weight of the motor retains the drive belt 25 at appropriate tension. As the motor operates, it drives the shaft 23 which carries the worms 27 and 33, one being provided with right and the other being provided with left-hand threads whereby the run 31a of the belt 31 will be driven to the right as viewed in Fig. 8 while the brush 36 is rotated in a direction to brush the loose flour on the top of the dough sheet against the run 31a of the belt whereby the excess flour is removed from the dough sheet as it moves beneath the brush. The elevating mechanism described enables the brush to be raised or lowered as may be found desirable depending on the thickness of the dough and also enables the brush to be raised sufficiently to an inoperative position out of contact with the dough when a particular batch being run on the table requires no brushing for removing excess flour. Located above the brush 36 is a sheet metal guard 60, the ends of which are secured to the plates 16 and 17 as by means of brackets 61 and tends to prevent the escape of flour from the casing during operation of the brush.

While I have shown and described apparatus that is illustrative of my improvements, it will be apparent that various changes in details may be resorted to within the spirit of the invention defined by the appended claims.

I claim:

1. Apparatus for removing loose flour from the surface of dough moving on a conveyor comprising a rotary brush adapted for disposition transversely of the conveyor at an elevation above the same for contact with the upper surface of dough on the conveyor, means for rotating the brush at a velocity for projecting flour from the dough in a direction rearwardly with respect to the direction of movement of the dough and upwardly from the dough, and an operable endless belt extending transversely of the conveyor above the dough with the runs thereof arranged vertically and against one of which runs the brush projects the flour for transportation by the belt to one side of the conveyor.

2. Apparatus for removing loose flour from the surface of dough moving on a conveyor comprising a rotary brush adapted for disposition transversely of the conveyor at an elevation above the same for contact with the upper surface of dough on the conveyor, means for rotating the brush at a velocity for projecting flour from the dough in a direction rearwardly with respect to the direction of movement of the dough and upwardly from the dough, an operable endless belt extending transversely of the conveyor above the dough with the runs thereof arranged vertically and against one of which runs the brush projects the flour for transportation by the belt to one side of the conveyor, and means at one side of the conveyor for removing the flour from the belt.

3. Apparatus for removing loose flour from the surface of dough moving on a conveyor comprising a rotary brush adapted for disposition transversely of the conveyor at an elevation above the same for contact with the upper surface of dough on the conveyor, means for rotating the brush at a velocity for projecting flour from the dough in a direction rearwardly with respect to the direction of movement of the dough and upwardly from the dough, an operable endless belt extending transversely of the conveyor above the dough with the runs thereof arranged vertically and against one of which runs the brush projects the flour for transportation by the belt to one side of the conveyor, and a scraper engaging the belt at a position laterally of the conveyor for removing the flour from the belt.

4. Apparatus for removing loose flour from the surface of dough moving on an endless conveyor comprising a casing disposed transversely of the conveyor and beneath which the conveyor moves, a vertically movable support within the casing, a rotatable brush carried by the support transversely of the conveyor, an endless belt carried by the support and having vertical runs disposed transversely of the conveyor rearwardly of the brush with respect to the direction of movement of the conveyor and with the lower edges thereof located above the level of the lower periphery of the brush, power operated driving mechanism for operating the belt transversely of the conveyor and for rotating the brush in a direction for projecting flour from the dough against the adjacent run of the belt, and means for adjusting said support vertically for adjusting the brush and belt concurrently into operative positions with respect to the surface of the dough on the conveyor.

5. In apparatus for removing loose flour from the surface of dough moving along a conveyor, a rotary brush disposed transversely of the conveyor at an elevation for brushing contact with the dough for projecting the flour upwardly and rearwardly with respect to the direction of movement of the dough, an endless belt extending transversely of the conveyor at the rear of the brush and above the dough and having the runs thereof disposed vertically, one run of said belt being located sufficiently close to the brush for intercepting the flour projected by the brush and conveying the flour to one side of the conveyor, a vertically adjustable support for the brush and belt, means for adjusting said support vertically for accommodating the brush to dough of different thicknesses, and motor operated power transmission mechanism for the belt and brush carried by said support.

6. In apparatus for removing loose flour from the surface of dough on a moving conveyor comprising a casing provided with end, side, and top walls and open at the bottom and adapted to be positioned transversely of the dough conveyor, a vertically adjustable supporting frame within the casing and comprising spaced apart end plates, means for effecting vertical adjustment of the frame within the casing, a horizontally disposed rotary brush carried by the support within the casing adapted to extend transversely of the conveyor in brushing contact with the dough thereon and operable at a velocity for projecting loose flour rearwardly and upwardly from the moving dough, an endless belt carried by the support rearwardly of the brush with the runs thereof disposed vertically and extending transversely of the conveyor, one of said runs being disposed sufficiently close to the brush for intercepting the flour projected by the brush for conveying the flour laterally from the conveyor, journaling means for one end of the brush and the corresponding end of the belt supported by one of said end plates, drive means carried by said other end plate for the other ends of said brush and belt, and manually operable means for effecting vertical adjustment of said end plates in unison for raising and lowering said brush and belt in accommodating the same to dough of different thicknesses on the conveyor.

7. Apparatus for removing loose flour from the surface of dough moving on a conveyor comprising a casing open at the bottom and adapted to be located transversely over a dough conveyor, a vertically adjustable frame within said casing comprising a pair of spaced apart end plates, a horizontal rotary brush located between said plates for brushing contact at the lower periphery thereof with dough on the conveyor, driven mechanism carried by one of said end plates for rotating said brush in a direction for projecting upwardly and rearwardly loose flour from the dough moving beneath the brush, said mechanism comprising a belt pulley on a driven vertical axis, said end plates being provided with passages located rearwardly of the brush and aligned with said drive pulley, an endless horizontal belt extending through said passages and having the runs disposed in vertical planes and against one of which runs said brush is adapted to project loose flour for transportation laterally of the conveyor through the passage in the other of said plates, an adjustable bracket mounted on said last mentioned plate, a second pulley for the belt carried by said bracket, means for adjusting the bracket for tensioning the belt, and means for adjusting said frame vertically for varying the elevation of the brush and belt for accommodating the same to different thicknesses of dough on the conveyor.

FRANK A. ANETSBERGER.

REFERENCES CITED

The following references are of record in the file of this patent:

UNITED STATES PATENTS

| Number | Name | Date |
| --- | --- | --- |
| 211,057 | Ruger et al. | Dec. 17, 1878 |
| 469,030 | Newlove | Feb. 16, 1892 |
| 1,183,672 | Ritchey et al. | May 16, 1916 |
| 1,738,240 | Graf | Dec. 3, 1929 |